(12) United States Patent
Galaktionova et al.

(10) Patent No.: US 11,397,271 B2
(45) Date of Patent: Jul. 26, 2022

(54) SYSTEMS AND METHODS TO CORRECT SEISMIC DATA FOR UNDESIRED EFFECTS CAUSED BY NEAR SURFACE VELOCITY VARIATIONS BY CORRECTING FOR LONG-WAVELENGTH STATICS

(71) Applicants: Saudi Arabian Oil Company, Dhahran (SA); Novosibirsk State University, Novosibirsk (RU)

(72) Inventors: Anastasiia Galaktionova, Novosibirsk (RU); Andrei Belonosov, Novosibirsk (RU); Diego Rovetta, Delft (NL); Mikhail Belonosov, Delft (NL)

(73) Assignees: Saudi Arabian Oil Company, Dhahran (SA); Novosibirsk State University, Novosibirsk (RU)

( * ) Notice: Subject to any disclaimer, the term of this patent is extended or adjusted under 35 U.S.C. 154(b) by 0 days.

(21) Appl. No.: 17/307,459

(22) Filed: May 4, 2021

(65) Prior Publication Data
US 2022/0171083 A1 Jun. 2, 2022

Related U.S. Application Data

(63) Continuation of application No. PCT/RU2020/000642, filed on Nov. 27, 2020.

(51) Int. Cl.
*G01V 1/30* (2006.01)
*G01V 1/28* (2006.01)

(52) U.S. Cl.
CPC ............. *G01V 1/305* (2013.01); *G01V 1/282* (2013.01); *G01V 2210/53* (2013.01); *G01V 2210/6222* (2013.01)

(58) Field of Classification Search
CPC .... G01V 1/305; G01V 1/282; G01V 2210/53; G01V 2210/6222
See application file for complete search history.

(56) References Cited

U.S. PATENT DOCUMENTS 6,424,918 B1 * 7/2002 Jorgensen ............... G01V 1/30
702/14
6,424,920 B1 7/2002 Osypov
(Continued)

FOREIGN PATENT DOCUMENTS

CN 104570106 A 4/2015
WO 2017035104 A1 3/2017

OTHER PUBLICATIONS

Cerveny et al., Seismic Ray Theory. New York: Cambridge University Press, 2001, Chapter 3, pp. 124-129.
(Continued)

*Primary Examiner* — Elias Desta
(74) *Attorney, Agent, or Firm* — Dinsmore & Shohl LLP

(57) ABSTRACT

Systems and methods are provided to correct seismic data for the undesired effects caused by near surface velocity variations. In one embodiment, a method includes receiving travel time data for a near surface region and estimating an initial velocity model for the near surface region using the travel time data. The method can include updating the velocity model by performing an inversion iteration of including inversion of travel times to estimate slowness. The process can also include calculating at least one long-wavelength static for the near surface region. The long-wavelength statics may be used to correct for undesired effects caused by near surface velocity variations.

18 Claims, 4 Drawing Sheets

(56) References Cited

U.S. PATENT DOCUMENTS

| | | |
|---|---|---|
| 2009/0257308 A1 | 10/2009 | Bevc et al. |
| 2012/0113751 A1* | 5/2012 | Goertz .................... G01V 1/36 367/54 |
| 2019/0324167 A1 | 10/2019 | Zhang |

OTHER PUBLICATIONS

Cox et al., Static Corrections for Seismic Reflection Surveys. SEG, TN269.84.C69,1999.

Danping et al., A hybrid tomography method for crosswell seismic inversion //Beijing 2014 International Geophysical Conference & Exposition, 2014.

Galaktinova et al., Computation of seismic wave field kinematics in a three-dimensional heterogeneous isotropic medium // AIP Conference Proceedings. 2017. vol. 1895.

Kim et al., CDP-domain Traveltime and Waveform Inversion for Initial Velocity Estimation, 10.1190/segam2020-3420050.1, 2020, pp. 1885-1889.

Lambare, Stereotomography // Geophysics. 2008. vol. 73.

Paige et al., M LSQR: Sparse linear equations and least squares problems // ACM Transactions on mathematical software. 1982. vol. 8.

Rovetta et al., Analysis of inter-domain coupling constraints for multi-physics joint inversion // Inverse Problems. 2018. vol. 34.

Smith, The Scientist and Engineer's Guide to Digital Signal Processing, Second Edition. California Technical Publishing,1999., Chapter 16, pp. 285-290.

Tong et al., Wave-equation based traveltime seismic tomography—Part 1: Method // Solid Earth Discussions. 2014. vol. 6.

Zhang et al., Nonlinear Refraction Traveltime Tomography // Geophysics. 1998. vol. 63.

International Search Report and Written Opinion pertaining to Int'l Appl. No. PCT/RU2020/000642 filed Nov. 27, 2020, dated Jul. 22, 2021, 10 pgs.

\* cited by examiner

SYSTEMS AND METHODS TO CORRECT SEISMIC DATA FOR UNDESIRED EFFECTS CAUSED BY NEAR SURFACE VELOCITY VARIATIONS BY CORRECTING FOR LONG-WAVELENGTH STATICS

CROSS-REFERENCE TO RELATED APPLICATION

This application is filed as a continuation of PCT/RU2020/000642 filed on Nov. 27, 2020, the entire disclosure of which is hereby incorporated herein by reference.

BACKGROUND

Variations in near surface regions can greatly affect seismic data processing. Conventional methods for seismic processing utilize various approaches. As an example, some approaches include iterative modeling which requires many iterations to process seismic information. Other conventional approaches require a regularization operator applied at each iteration to guarantee geologically reasonable results. Existing approaches can also require performing operations such as ray tracing. Similarly, conventional refraction tomography techniques typically require regularization to smooth characterizations of velocity data. The aforementioned operations are computationally intensive and improved processes and systems to process seismic data are needed.

SUMMARY

Embodiments of the present disclosure are directed to systems and methods to correct seismic data for near surface velocity variations. A method is provided that includes receiving travel time data for at least one seismic trace relative to a near surface region and generating, by a processor, an estimation of an initial velocity model for the near surface region using the travel time data, wherein the initial velocity model is a linear function of three-dimensional space coordinates and constant parameters. The method includes determining, by the processor, an updated velocity model by performing an inversion iteration, wherein the inversion iteration includes inversion of the travel time data to estimate slowness, and calculating, by the processor, at least one long-wavelength static for the near surface region using the updated velocity model, wherein at least one long-wavelength static is a vertical travel time from surface to a datum. The method includes correcting, by the processor, at least one undesired effect of near surface velocity variation using the at least one long-wavelength static.

In one embodiment, a first arrival time is selected for the at least one seismic trace to generate the initial velocity model.

In one embodiment, the travel time data is for at least a first source and at least a first receiver, and wherein the initial velocity model is updated using travel time relative to linear media for the at least a first source and the at least a first receiver.

In one embodiment, the initial velocity model is a linear function of the space coordinates (x, y, z) with the constant parameters (a, b, c, d) represented as $$v_0(x,y,z) = ax+by+cz+d$$

and is generated by minimizing a function representing coordinates for the source and receiver, measured travel time and travel time in linear media, the function represented as $$\min_{a,b,c,d} \sum_{i,j} \omega_{ij} [\tau(S_i, R_j; a, b, c, d) - \tau^*(S_i, R_j)]^2$$

where $S_i$ is the coordinate of $i^{th}$ source, $R_j$ is the coordinate of $j^{th}$ receiver, $\tau^*(S_i, R_j)$ is the measured travel time from $i^{th}$ source to $j^{th}$ receiver and $\tau(S_i, R_j; a, b, c, d)$ is the travel time in linear media $v_0$ and wherein $$\omega_{ij} = \frac{1}{N_{gr} \cdot N_{S_i, R_j}}$$

is me weight with $N_{gr}$ being the number of groups of a particular distance between a source and receiver (normalizes across groups) and $N_{S_i,R_j}$ is the number of rays in the group to which $S_i$ and $R_j$ correspond (normalizes within the group).

In one embodiment, the initial velocity model is based on a travel time function for linear media, wherein the travel time function for linear media is expressed as $$\tau(S_i, R_j) = \frac{1}{|g|} \ln \frac{\sqrt{1+\left(\frac{2}{|S_i - R_j|}\right)^2 \frac{v(S_i) \cdot v(R_j)}{|g|^2}} + 1}{\sqrt{1+\left(\frac{2}{|S_i - R_j|}\right)^2 \frac{v(S_i) \cdot v(R_j)}{|g|^2}} - 1},$$

where $v$ is the velocity in this media and $g=(a, b, c)$.

In one embodiment, a system for the updated velocity model is solved using a least squares process.

In one embodiment, the inversion of the travel time data for the slowness uses a representation of the slowness as a continuous function in space, wherein slowness is an inverse of velocity.

In one embodiment, correcting at least one undesired effect of near surface velocity variation includes correction of at least one of a lateral and vertical velocity variation of the near surface region.

In one embodiment, correcting at least one undesired effect of near surface velocity variation using the at least one long-wavelength static includes correction of the travel time data.

In one embodiment, the method also includes outputting at least one of corrected travel time data and a corrected trace.

Another embodiment is directed to a system to correct seismic data for near surface velocity variations. The system includes at least one receiver configured to a receive seismic trace for a near surface region, and a processor configured to receive travel time data from the receiver for at least one seismic wave trace relative to a near surface region. The processor is configured to generate an estimation of an initial velocity model for the near surface region using the travel time data, wherein the initial velocity model is a linear function of three-dimensional space coordinates and constant parameters. The processor is configured to determine an updated velocity model by performing an inversion iteration, wherein the inversion iteration includes inversion of the travel time data to estimate slowness. The processor is configured to calculate at least one long-wavelength static for the near surface region using the updated velocity model, wherein the at least one long-wavelength static is a vertical travel time from surface to a datum. The processor is also configured to correct at least one undesired effect of near surface velocity variation using the at least one long-wavelength static.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE DISCLOSURE

Figure 1A:
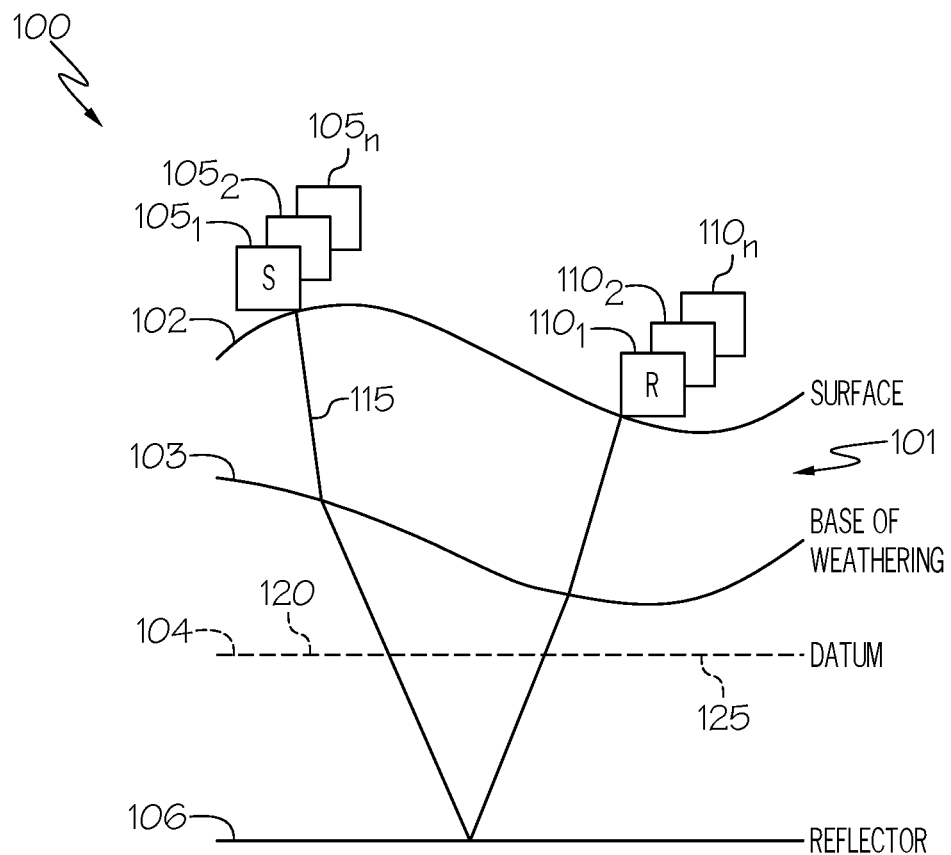
FIG. 1A illustrates an example of a seismic wave path and subsurface region.

Embodiments of the present disclosure are directed to systems and methods for seismic refraction tomography, namely, long-wavelength static correction. Particularly, the methods and systems described herein calculate long-wavelength statics and can perform corrections for seismic data processing. Processes and configurations are provided for long-wavelength statics calculation that include estimation of a velocity model for a near surface region, or shallow part (e.g., near surface) of a subsurface. Velocity models as described herein may improve refraction tomography. By way of example, systems and processes described herein can eliminate the need for several iterations while providing sufficient accuracy. In addition, systems and processes described herein do not require or utilize a regularization operator. Embodiments described herein calculate long-wavelength statics by making use of only one inversion iteration of refraction tomography, therefore saving computational time and resources.

Embodiments described herein include operations for implementation of automatic data-driven estimation of an initial linear velocity model by solving an optimization problem, wherein a model is a linear function of three-dimensional space coordinates and constant parameters. Embodiments also use an inversion iteration of refraction tomography to retrieve an updated (e.g., final) velocity model, wherein an updated model is described as a continuous function and is represented by the decomposition of elementary smooth basis functions. As a result the velocity model is smooth by definition. Embodiments also include calculation of long-wavelength statics through an integration operation of the final slowness (i.e., inverse of the updated velocity model) along a vertical axis.

In some embodiments, a process is identified that includes estimation of an initial velocity model for seismic waves through an area, estimation of an updated velocity model through an inversion iteration of the refraction tomography, and a long wave statics computation. The initial velocity model is based on seismic travel times and is expressed as a linear function. An updated velocity model is determined by taking the inverse of the initial velocity model (i.e., slowness) and multiple operations to update the velocity model including minimizing the difference between measured and reference travel time. The long-wavelength statics computation compensates for effects of the near surface using a datum (i.e. reference plane near the surface). One advantage of the process is that ray tracing does not need to be performed and the computation is simplified.

Processes and configurations described herein provide several advantages. Unlike conventional processes that use nodes of a certain grid, which requires extra smoothing, in this disclosure a smooth function is used. Also, by using an initial velocity model which is the optimal linear function, the calculation is much faster. The initial velocity model described herein also accounts for lateral variations. Ray-tracing and iterative inversion are not required. Features described herein significantly reduce computational cost when compared with standard approaches. Processes described herein can significantly reduce the density of ray coverage required without detriment to the results due to the particular parameterization. In addition, a velocity model as described herein is smooth by definition in that the velocity model has no high frequency oscillations or undesirable boundary effects.

Referring now to FIG. 1A, an example seismic wave path and subsurface region are illustrated. System 100 can include at least one source, such as sources $105_{1-n}$, and at least one receiver, such as receivers $110_{1-n}$. Processes and configurations described herein can calculate long-wavelength statics using an estimation of a velocity model for a near surface region or shallow part of a subsurface.

Abrupt lateral and vertical velocity variations of the near surface strongly affect seismic waves in a near surface region and in turn, seismic measurements and imaging. As described herein, long-wavelength statics are time shifts that may be used to characterize a near surface region. Processes and operations are described herein to calculate long-wavelength statics and apply the calculations to the seismic traces to correct for undesired effects, such as time shifts. Embodiments of the disclosure can include dividing a velocity model into a number of sections, such that in each section the velocity distribution can be described by a linear function. Operations described herein are applied to solve an optimization (e.g., minimization) problem for each section and to generate an initial velocity model for a local velocity distribution. From the initial velocity model an updated (e.g., final) velocity model may be determined by applying one inversion iteration of refraction tomography. The updated velocity model may be determined without solving any forward problem (i.e., no ray-tracing is performed). Using a single iteration of a velocity model inversion dramatically reduces computational cost of a seismic processing system. According to embodiments of the disclosure, the updated velocity distribution is generated as a weighted sum of smooth basis functions, therefore the velocity distribution is smooth by definition and a refraction tomography operation does not require any regularization.

Figure 1B:
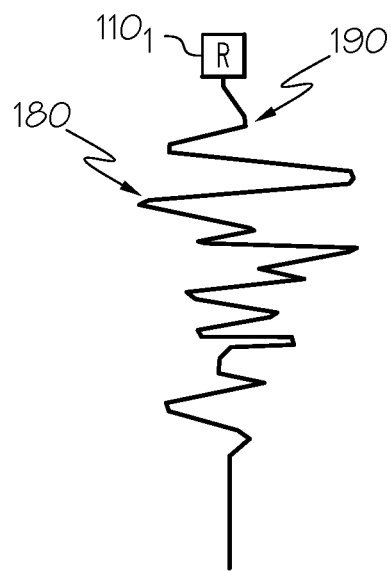
FIG. 1B illustrates an example of a seismic trace.

FIG. 1A illustrates near surface region 101 with surface 102 and an exemplary seismic wave path 115. In order to analyze a subsurface using seismic imaging or a subsurface seismic experiment, at least one seismic source, such as source $105_1$, generates at least one seismic wave that propagates in the Earth's layers. After the interaction with the subsurface, part of these seismic waves are then recorded by at least one receiver, such as receiver $110_1$, or a group of seismic receivers. FIG. 1B illustrates an example of a seismic trace 180 and first arrival time 190 of the trace. Acquired signals by a receiver are seismic traces, such as seismic trace 180 shown in FIG. 1B. From seismic traces a travel time of the refracted wave can be extracted for seismic waves from each source to each receiver. Sources $105_{1-n}$ and receivers $110_{1-n}$ may each have different locations, the coordinates of each location and travel times may be used for processes described herein. Systems and processes described herein can receive seismic data, including travel times, as input data. As discussed below with reference to FIG. 2, processes as described herein use observed first arrival times of a refracted wave and travel times estimated in a relevant linear media. Systems and processes described herein can perform operations for refraction tomography to derive, through an inversion process, the velocity distribution of the seismic waves in the area covered by the seismic acquisition, such as near surface region 101.

FIG. 1A illustrates near surface region 101, which may be a subsurface region, and base of weathering 103, which may be the lower boundary of a near-surface low-velocity zone in which rocks are physically, chemically or biologically broken down, in some cases coincident with a water table. Datum 104 may be a planar surface or level for use with corrections. Reflector 106 may be a reflection plane for seismic wave path 115. Processes and configurations described herein can calculate statics which may be the vertical travel time from surface 102 to datum 104. FIG. 1A illustrates the source and receiver projection points 120 and 125 (e.g., S and R on datum 104), respectively, which may be used to calculate corresponding statics. Long wavelength statics described herein refer to just one vertical travel time from surface 102 to datum 104 without any intermediate datum. In addition to travel times for seismic wave path 115 relative to source 105 and receiver 110, coordinates of source 105 and receiver 110 may be used for velocity model and long wavelength static determinations.

According to some embodiments, subsurface region 101 may optionally be divided into overlapping sections to reduce the computational time (e.g., parallelization) and to optimize the memory usage. The overlap of sections may guarantee spatial continuity of the velocity estimation at sections edges. By way of example, near surface region 101 is an investigation area having a 6 km length, wherein the 6 km length may be divided into five overlapping sections (each 2 km long), corresponding to: 0 km-2 km, 1 km-3 km, 2 km-4 km, 3 km-5 km, 4 km-6 km.

Figure 2:
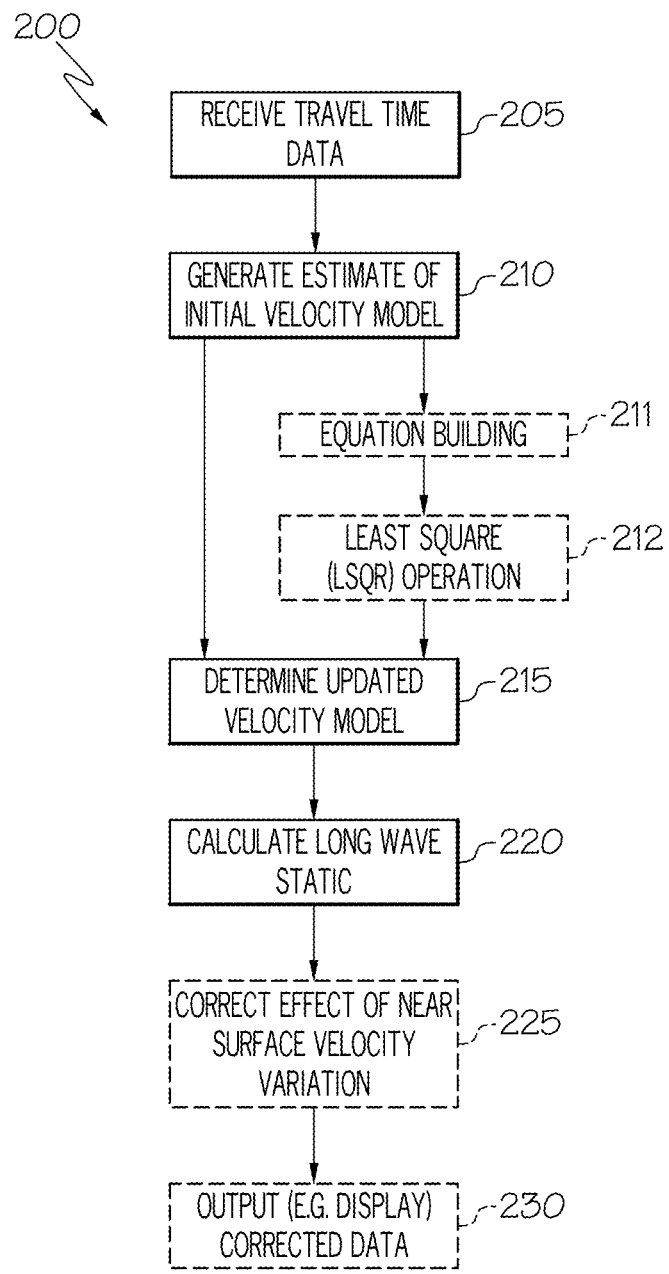
FIG. 2 illustrates a process to correct for near surface velocity variations.

FIG. 2 illustrates process 200 to correct seismic data for near surface velocity variations. Process 200 may be performed for improving seismic refraction tomography and eventually seismic imaging. It should be appreciated that process 200 may be applied to improve the results of other applications of seismic data processing. Near surface velocity variations for process 200 are described below with reference to region, such as near surface region 101, or subsurface region in general. Process 200 may be performed by device including a processor as discussed below with reference to FIG. 3.

Process 200 includes receiving travel time data at block 205 for at least one seismic trace relative to a near surface region. Travel time data received at block 205 may be for at least a first source and at least a first receiver. Receiving travel time data at block 205 may include selection of a first arrival time for the at least one seismic trace to generate the initial velocity model. To select a first arrival time, prior knowledge about a particular region may be used for selection. Selection of a first arrival time may be based on cross-correlation, sudden change of signal amplitude, energy for a first break, and/or artificial intelligence.

Inputs for process 200 to generate a velocity model (e.g., velocity distribution) may include acquired data (e.g., seismic travel times extracted from seismic data) and acquisition geometry data such as coordinates of sources and receivers in three-dimensional (3D) space. Process 200 does not require an initial velocity distribution, which may be mandatory in other methods such as standard refraction tomography.

Process 200 includes generating an estimation of an initial velocity model for the near surface region using the travel time data at block 210. Process 200 uses seismic travel times to derive an initial velocity model which may be an initial guess of the velocity distribution of the seismic waves. To generate the initial velocity model, the seismic acquisition may be divided into many adjacent sections. Process 200 may operate on an assumption that in each of these sections the velocity model $v_0$ can be expressed as a linear function of three-dimensional space coordinates (x, y, z) with the constant parameters (a, b, c, d) as follows:

$$v_0(x,y,z) = ax + by + cz + d \quad (1)$$

or in a vector form as $$v_0(x) = g \cdot x + d, \quad (2)$$

where g=(a, b, c).

To estimate unknown parameters a, b, c and d process 200 includes minimizing the following function:

$$\min_{a,b,c,d} \sum_{i,j} \omega_{ij}[\tau(S_i, R_j; a, b, c, d) - \tau^*(S_i, R_j)]^2 \quad (3)$$

where $S_i$ is the coordinate of $i^{th}$ source, $R_j$ is the coordinate of $j^{th}$ receiver, $\tau^*(S_i, R_j)$ is the measured travel time from $i^{th}$ source to $j^{th}$ receiver, $\tau(S_i, R_j; a, b, c, d)$ is the travel time in linear media $v_0$ and $$\omega_{ij} = \frac{1}{N_{gr} \cdot N_{S_i,R_j}}$$

with $N_{gr}$ being the number of groups of a particular distance between a source and receiver (normalizes across group) and $N_{S_i,R_j}$ the number of rays in the group to which $S_i$ and $R_j$ correspond (normalizes within the group). The initial velocity model is based on a travel time function for linear media, which can be estimated using the explicit formula:

$$\tau(S_i, R_j) = \frac{1}{|g|} \ln \frac{\sqrt{1 + \left(\frac{2}{|S_i - R_j|}\right)^2 \frac{v(s_i) \cdot v(R_j)}{|g|^2}} + 1}{\sqrt{1 + \left(\frac{2}{|S_i - R_j|}\right)^2 \frac{v(s_i) \cdot v(R_j)}{|g|^2}} - 1}, \quad (4)$$

where v is the velocity in this media and g=(a, b, c).

The linear velocity model $v_0$ obtained by the minimization process is the initial velocity model for the next step, implementing one inversion iteration of refraction tomography.

Process 200 may optionally include equation building at block 211 and a least squares operation at block 212 aide in updating or generating an updated velocity model. Process 200 may include determining an updated velocity model using travel time relative to linear media for the at least a first source and the at least a first receiver. A system for an updated velocity model may be solved using a least squares process.

At block 215, process 200 includes determining an updated velocity model by performing one iteration of refraction tomography. Travel times may be inverted to estimate slowness (i.e., the inverse of velocity).

To calculate a velocity model $v(x, y, z)$, process 200 continues from the previously calculated initial velocity model $v_0(x, y, z)$. In the following calculations slowness is defined as:

$$n(x, y, z) = \frac{1}{v(x, y, z)}. \tag{5}$$

The updated velocity model can be calculated by taking the inverse of the estimated slowness. The inversion process uses a representation of slowness as a continuous function in space. By solving a system of linear equations constrained by the observed travel times, a slowness distribution is then determined as a continuous function in the space $(x, y, z)$. Using digital signal processing, any time-continuous signal $x(t)$ can be represented by the linear combination of the corresponding time-discrete signal with a reconstruction filter $B(t)$:

$$x(t) = \sum_{i=-\infty}^{\infty} x(t_i) B(t - t_i), \tag{6}$$

where $x(t_i)$ is $i^{th}$ sample at time $t_i$. Thus, by a known set of values at the nodes of a 3D grid, the slowness $n(x, y, z)$ can be represented as a continuous function in the space as:

$$n(x, y, z) = \sum_{l=-\infty}^{\infty} \sum_{k=-\infty}^{\infty} \sum_{m=-\infty}^{\infty} n_{lkm} B_x(x - x_l) B_y(y - y_k) B_z(z - z_m), \tag{7}$$

where $n_{lkm}$ is the unknown slowness coefficient at the node $(x_l, y_k, z_m)$ of the grid, and $B_x$, $B_y$ and $B_z$ are windowed cardinal sine functions.

In process 200, the reconstruction function acts as a basis function for the velocity model approximation. Under certain conditions (Nyquist-Shannon sampling theorem) the reconstruction function can be truncated (e.g., finite support) and the number of summations in (7) becomes finite. As reconstruction functions we can use windowed cardinal sine functions:

$$B(x) = C \cdot \operatorname{sinc}(2\pi f_c) \cdot \omega\left(\frac{x}{2N}\right), -N \leq x \leq N, \tag{8}$$

where $\omega$ is a window used to truncate the infinite response of the sine function, C is a normalizing coefficient, $f_c$ is the normalized cutoff frequency, $0 \leq f_c \leq 0.5$, and N is the number of nodes on the half of the support.

As a truncation window we can use the Blackman window:

$$\omega(x)=0.42+0.5\cos(2\pi x)+0.08\cos(4\pi x), -0.5 \leq x \leq 0.5. \tag{9}$$

Different choices for the reconstruction function and for the truncation window can be made. Since the reconstruction functions are smooth, also the final slowness and velocity functions will be smooth.

The expression for the travel time $\tau$ along the path (ray) $\Gamma(n, S_i, R_j)$ between the points $S_i$ and $R_j$ in the medium with slowness $n=n(x, y, z)$ is described by the following formula:

$$\tau(n; S_i, R_j) = \int_{\Gamma(n; S_i, R_j)} n(x, y, z) ds. \tag{10}$$

After omitting the indices $S_i$, $R_j$ inside the brackets and linearizing the operator around $n_0$, we obtain:

$$\tau(n) = \int_{\Gamma(n)} n(x,y,z) ds \approx \int_{\Gamma(n_0)} n_0(x,y,z) ds + \int_{\Gamma(n_0)} h ds, \tag{11}$$

where h is defined by $h=n-n_0$, $\Gamma(n)$ is a ray from the point $S_i$ to the point $R_j$ in a medium with slowness $$n, n_0 = n_0(x, y, z) = \frac{1}{v_0(x, y, z)}$$

is me initial slowness and $\Gamma(n_0)$ is a ray from the point $S_i$ to the point $R_j$ in a medium with slowness $n_0$. We can rewrite (11) as:

$$\tau^* - \tau(n_0) = \int_{\Gamma(n_0)} h ds, \tag{12}$$

where $\tau^*$ are the observed travel times and $\tau(n_0)$ are the travel times calculated by using explicit formulas for waves, travelling in a linear medium.

Since the initial velocity is linear, we can use the explicit formula for calculating the ray path in the linear medium:

$$r = r_0 + q \cdot \frac{\sin(k \cdot s)}{k} - \frac{1 - \cos(k \cdot s)}{k^2} \cdot \frac{q \times [g \times q]}{v(r_0)}, \tag{13}$$

where r is a point on the ray, $r_0$ is the starting point of the ray, k is the curvature of the circle—the ray form in the linear medium, s is the length of the ray from the source point to a current point, g is the velocity gradient (see formula (2)), q is the tangent to the circle at point $r_0$.

Taking into account expression (7) for n and $n_0$, the following expression may be provided:

$$\tau^* - \tau(n_0) = \tag{14}$$

$$\sum_{l=-\infty}^{\infty} \sum_{k=-\infty}^{\infty} \sum_{m=-\infty}^{\infty} h_{lkm} \int_{\Gamma(n_0)} B_x(x - x_l) B_y(y - y_k) B_z(z - z_m) ds$$

Hence, linear system $Ah=\Delta\tau$, where $\Delta\tau=\tau^*-\tau(n_0)$ is obtained and the coefficients of the matrix A are the following integrals along the rays:

$$\int_{\Gamma(n_0; S_i, R_j)} B_x(x-x_l) B_y(y-y_k) B_z(z-z_m) ds \tag{15}$$

The linear system can be solved for h by using LSQR-method which may be performed at block 212. The final slowness and velocity model can be calculated from (5) and (7) after substituting $n_{lkm}=n_{0,lkm}+h_{lkm}$ (slowness/velocity update).

At block 220, process 200 includes calculating at least one long-wavelength static for the near surface region using the final linear velocity model. The at least one long-wavelength static may be a vertical travel time from surface to a datum. Long-wavelength static corrections may be applied to the seismic data to compensate for the effects of the near surface, such as subsurface variations in near surface region 101 of FIG. 1A. Calculation of the long-wavelength statics allows for determination of travel times which would have been observed if all measurements have been made on a reference plane called datum, at the bottom of the near surface. The long-wavelength static at the point (x, y) on the surface can be finally calculated as the vertical integral of the slowness from the surface to the datum:

$$S(x, y) = \int_{Z_0}^{z_{datum}} n(x, y, z)dz. \quad (16)$$

Process 200 may optionally include correcting at least one undesired effect of near surface velocity variation at block 225 using the at least one long-wavelength static. Correcting at least one undesired effect caused by near surface velocity variation includes correction of at least one effect caused by a lateral and vertical velocity variation of the near surface. The disclosure provides operations directed to correction for long-wavelength statics including effects caused by near surface velocity variations. Process 200 may optionally include outputting corrected data at block 230. Output of corrected data may include output of at least one of corrected travel times, corrected traces, and parameters in general for correction of seismic data.

Figure 3:
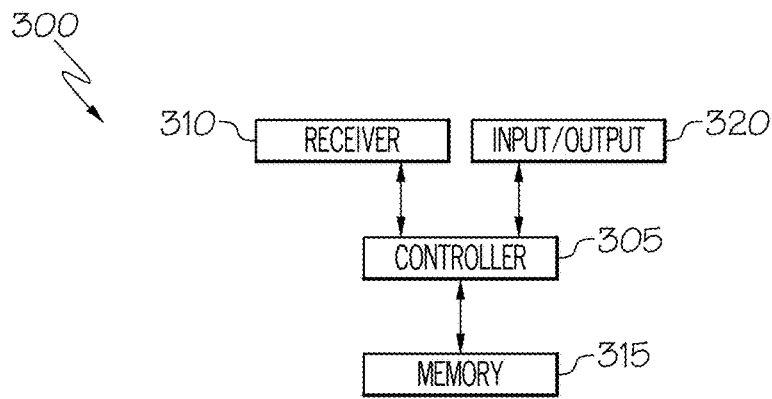
FIG. 3 illustrates an example representation of a device configured to correct near surface velocity variations for seismic refraction tomography.

FIG. 3 depicts a graphical representation of a device according to embodiments described herein. According to one embodiment, device 300 may relate to a device configured to correct near surface velocity variations for seismic refraction tomography. Device 300 may be part of a system, such as system 100 of FIG. 1A. Device 300 may be configured to receive at least one of travel time data and seismic trace from a receiver from a near surface region. According to one or more embodiments, device 300 includes controller 305, receiver 310, memory 315 and input/output block 320. Device 300 may relate to a seismic wave detection device (e.g., receiver 110).

Controller 305 may relate to a processor or control device configured to execute one or more operations stored in memory 315, such as processes for calculation of long-wavelength statics. Controller 305 may be configured to perform one or more processes herein including process 200 of FIG. 2.

Controller 305 may be coupled to memory 315, I/O 320 and receiver 310. Controller 305 may be configured to control operations based on one or more inputs from I/O block 320. Device 300 may output corrected data by way of I/O block 320. In some embodiments, high performance computer (HPC) clusters may be used to accelerate the computations and utilized by device 300.

Figure 4:
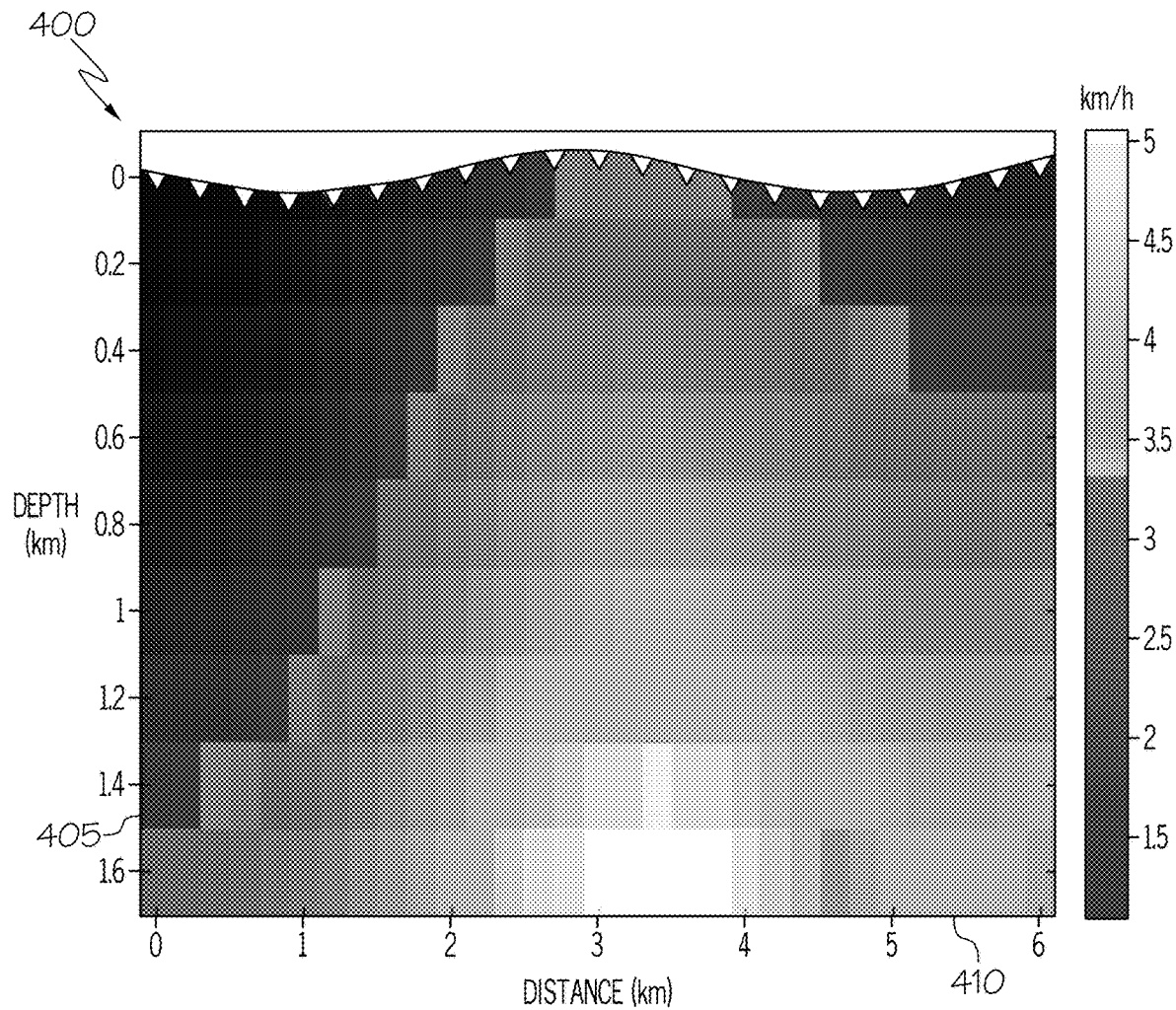
FIG. 4 is a graphical illustration of a velocity cross-section of a synthetic model.

FIG. 4 is a graphical illustration of a velocity cross-section 400 (with a fixed y-coordinate) for a synthetic model. Velocity cross-section 400 illustrates long-wavelength statics estimation in land data. Embodiments described herein provide unexpected results based on one refraction tomography inversion iteration that is sufficient to recover a low frequency velocity component with acceptable accuracy. FIG. 4 represents a synthetic dataset used to confirm embodiments described herein and provides an example geometry of a near surface region.

Figure 5:
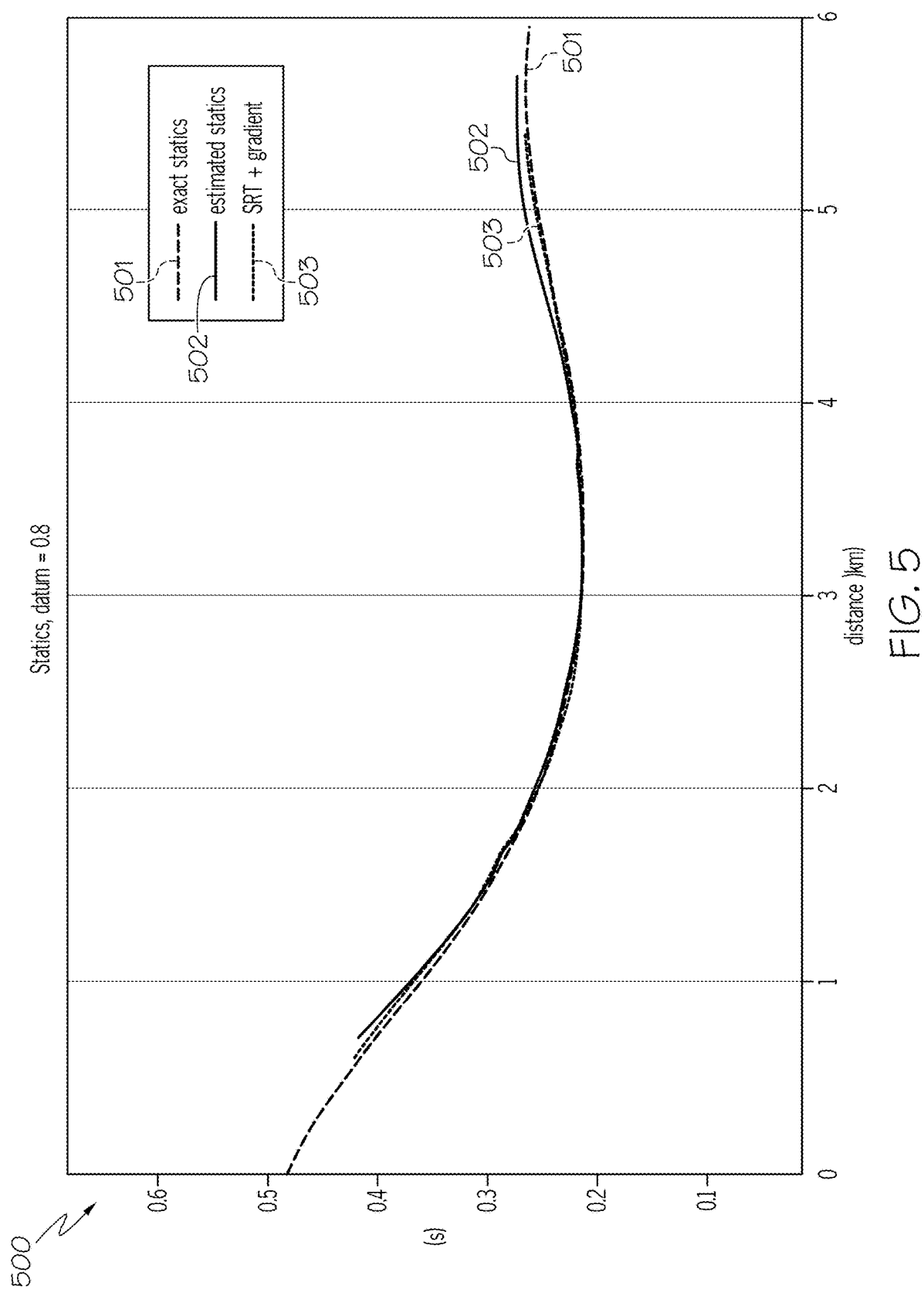
FIG. 5 is a graphical representation of statics.

FIG. 5 is a graphical representation of calculated statics and shows a comparison of the exact statics with the ones obtained by methods described herein and by a standard refraction tomography. Embodiments are verified using a synthetic 2.5 D model. For verification, a whole area was divided into five overlapping sections (2 km long) and long wavelength statics were estimated separately. Finally, the 5 results were merged to obtain a statics solution. The results were compared with the results obtained by a standard refraction tomography in a controlled numerical test with a synthetic dataset. Synthetic dataset (travel times) were generated from the 2.5D velocity model and the geometry of FIG. 4 The synthetic velocity model is described by the equation:

$$v(x, y, z) = 1.4 * \left( 0.2 + 0.1x - 0.5\cos\left(\frac{5}{x}\right) + z - 0.12\cos\left(\frac{\pi}{10}(x-5)\right)z^2 \right)$$

FIG. 5 illustrates a comparison 500 of exact statics solution 501 (dashed line) with the results obtained with processes described herein shown as 502 and the results of a conventional refraction tomography shown as 503. The results shown in FIG. 5 illustrate a high level of conformance (e.g., agreement) between the results and confirming the accuracy of the embodiments described herein.

Processes and configurations described herein provide a solution including operations to estimate the subsurface velocity via an optimal linear velocity function; apply one inversion iteration of refraction tomography, after representing the medium as a combination of smooth basis functions, and estimate long-wavelength statics by integration along the depth coordinate. Benefits of the processes described herein eliminate the need for ray tracing, which is a resource-intensive process and reduce the computational load for determining statics.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A method to correct seismic data for near surface velocity variations, the method comprising:
   receiving, by a receiver, travel time data for at least one seismic trace relative to a near surface region;
   generating, by a processor, an estimation of an initial velocity model for the near surface region using the travel time data, wherein the initial velocity model is a linear function of three-dimensional space coordinates and constant parameters;

determining, by the processor, an updated velocity model by performing an inversion iteration, wherein the inversion iteration includes inversion of the travel time data to estimate slowness;

calculating, by the processor, at least one long-wavelength static for the near surface region using the updated velocity model, wherein the at least one long-wavelength static is a vertical travel time from surface to a datum;

correcting, by the processor, at least one undesired effect of near surface velocity variation using the at least one long-wavelength static; and outputting at least one of a corrected travel time data and a corrected seismic trace.

2. The method of claim 1, wherein a first arrival time is selected for the at least one seismic trace to generate the initial velocity model.

3. The method of claim 1, wherein the travel time data is for at least a first source and at least a first receiver, and wherein the initial velocity model is updated using travel time relative to linear media for the at least a first source and the at least a first receiver.

4. The method of claim 1, wherein the initial velocity model is a linear function of the space coordinates (x, y, z) with the constant parameters (a, b, c, d) represented as $$v_0(x,y,z)=ax+by+cz+d$$

and is generated by minimizing a function representing coordinates for the source and receiver, measured travel time and travel time in linear media, the function represented as $$\min_{a,b,c,d} \sum_{i,j} \omega_{ij}[\tau(S_i, R_j; a, b, c, d) - \tau^*(S_i, R_j)]^2$$

where $S_i$ is the coordinate of $i^{th}$ source, $R_j$ is the coordinate of $j^{th}$ receiver, $\tau^*(S_i, R_j)$ is the measured travel time from $i^{th}$ source to $j^{th}$ receiver and $\tau(S_i, R_j; a, b, c, d)$ is the travel time in linear media $v_0$ and $$\omega_{ij} = \frac{1}{N_{gr} \cdot N_{S_i,R_j}}$$

with $N_{gr}$ being the number of groups of a particular distance between a source and receiver, normalizes across group, and $N_{S_i,R_j}$ the number of rays in the group to which $S_i$ and $R_j$ correspond, normalizes within the group.

5. The method of claim 1, wherein the initial velocity model is based on a travel time function for linear media, wherein the travel time function for linear media is expressed as $$\tau(S_i, R_j) = \frac{1}{|g|} \ln \frac{\sqrt{1 + \left(\frac{2}{|S_i - R_j|}\right)^2 \frac{v(S_i) \cdot v(R_j)}{|g|^2} + 1}}{\sqrt{1 + \left(\frac{2}{|S_i - R_j|}\right)^2 \frac{v(S_i) \cdot v(R_j)}{|g|^2} - 1}},$$

where v is the velocity in this media and g=(a, b, c).

6. The method of claim 1, wherein a system for the updated velocity model is solved using a least squares process.

7. The method of claim 1, wherein the inversion of the travel time data for slowness uses a representation of slowness as a continuous function in space, wherein slowness is an inverse of velocity.

8. The method of claim 1, wherein correcting at least one undesired effect of near surface velocity variation includes correction of at least one of a lateral and vertical velocity variation of the near surface region.

9. The method of claim 1, wherein correcting at least one undesired effect of near surface velocity variation using the at least one long-wavelength static includes correction of travel time data.

10. A system to correct near surface velocity variations for seismic refraction tomography, the system comprising:
at least one receiver configured to a receive seismic trace for a near surface region; and
at least processor configured to
receive travel time data from the receiver for at least one seismic trace relative to a near surface region;
generate an estimation of an initial velocity model for the near surface region using the travel time data, wherein the initial velocity model is a linear function of three-dimensional space coordinates and constant parameters;
determine an updated velocity model by performing an inversion iteration, wherein the inversion iteration is based on the inversion of travel time data to estimate slowness;
calculate at least one long-wavelength static for the near surface region using the final velocity model, wherein the at least one long-wavelength static is a vertical travel time from surface to a datum;
correct at least one undesired effect of near surface velocity variation using the at least one long-wavelength static; and
output at least one of a corrected travel time data and a corrected seismic trace.

11. The system of claim 10, wherein a first arrival time is selected for the at least one seismic trace to generate the initial velocity model.

12. The system of claim 10, wherein the travel time data is for at least a first source and at least a first receiver, and wherein the initial velocity model is updated using travel time relative to linear media for the at least a first source and the at least a first receiver.

13. The system of claim 10, wherein the initial velocity model is a linear function of the space coordinates (x, y, z) with the constant parameters (a, b, c, d) represented as $$v_0(x,y,z)=ax+by+cz+d$$

and is generated by minimizing a function representing coordinates for the source and receiver, measured travel time and travel time in linear media, the function represented as $$\min_{a,b,c,d} \sum_{i,j} \omega_{ij}[\tau(S_i, R_j; a, b, c, d) - \tau^*(S_i, R_j)]^2$$

where $S_i$ is the coordinate of $i^{th}$ source, $R_j$ is the coordinate of $j^{th}$ receiver, $\tau^*(S_i, R_j)$ is the measured travel time from $i^{th}$ source to $j^{th}$ receiver and $\tau(S_i, R_j; a, b, c)$ is the travel time in linear media $v_0$ and $$\omega_{ij} = \frac{1}{N_{gr} \cdot N_{S_i,R_j}}$$

with $N_{gr}$ being the number of groups of a particular distance between a source and receiver, (normalizes across group, and $N_{S_i,R_j}$ the number of rays in the group to which $S_i$ and $R_j$ correspond, normalizes within the group.

14. The system of claim 10, wherein the initial velocity model is based on a travel time function for linear media, wherein the travel time function for linear media is expressed as $$\tau(S_i, R_j) = \frac{1}{|g|} \ln \frac{\sqrt{1 + \left(\frac{2}{|S_i - R_j|}\right)^2 \frac{v(S_i) \cdot v(R_j)}{|g|^2} + 1}}{\sqrt{1 + \left(\frac{2}{|S_i - R_j|}\right)^2 \frac{v(S_i) \cdot v(R_j)}{|g|^2} - 1}},$$

where v is the velocity in this media and g=(a, b, c).

15. The system of claim 10, wherein a system for the updated velocity model is solved using a least squares process.

16. The system of claim 10, wherein the inversion of travel time data for the slowness uses a representation of slowness as a continuous function in space, wherein slowness is an inverse of velocity.

17. The system of claim 10, wherein correcting at least one undesired effect of near surface velocity variation includes correction of at least one of a lateral and vertical velocity variation of the near surface region.

18. The system of claim 10, correcting at least one undesired effect of near surface velocity variation using the at least one long-wavelength static includes correction of the travel time data.

\* \* \* \* \*